US005513760A

United States Patent [19]
Luebke

[11] Patent Number: 5,513,760
[45] Date of Patent: May 7, 1996

[54] STACKER CRANE WITH IMPROVED BRAKE MECHANISM

[75] Inventor: Roger D. Luebke, Hartford, Wis.

[73] Assignee: Harnischfeger Corporation, Brookfield, Wis.

[21] Appl. No.: 524,163

[22] Filed: Aug. 31, 1995

Related U.S. Application Data

[63] Continuation of Ser. No. 195,120, Feb. 14, 1994, abandoned.

[51] Int. Cl.⁶ .................................... B66B 5/04
[52] U.S. Cl. ..................... 212/313; 187/375; 187/376; 188/67
[58] Field of Search .................. 212/213, 128, 212/129, 130, 319, 333, 334, 335; 187/84, 89, 90, 374, 375, 376; 414/281, 673, 560, 561; 188/67

[56] References Cited

U.S. PATENT DOCUMENTS

| | | | |
|---|---|---|---|
| 1,581,459 | 4/1926 | Lindquist | 187/90 |
| 3,250,399 | 5/1966 | Deschantreiter. | |
| 3,250,402 | 5/1966 | De Ligt | 187/88 |
| 3,653,467 | 4/1972 | Showalter | 187/89 |
| 4,529,066 | 7/1985 | Wieschel. | |
| 5,141,081 | 8/1992 | Kregel et al. | 187/83 |
| 5,209,325 | 5/1993 | Gines et al. | 187/89 |
| 5,386,889 | 2/1995 | Pipes | 188/67 |

OTHER PUBLICATIONS

Powermast Overhead Cranes Care and Operation Manual, Harnischfeger Corporation, 1990, pp. 8–10, 8–11, 9–17 & 9–18.

Primary Examiner—David A. Bucci
Assistant Examiner—Thomas J. Brahan
Attorney, Agent, or Firm—Michael, Best & Friedrich

[57] ABSTRACT

A stacker crane comprising a trolley movable above the ground, a generally vertical rigid mast depending form the trolley, an assembly including a frame moveable along the mast, and a load engaging mechanism mounted on the frame, an adaptor plate mounted on the frame for vertical movement relative thereto, and a brake mechanism including a housing fixed against vertical movement relative to the plate, a brake member which is supported by the housing and which engages the mast to prevent downward movement of the housing relative to the mast consequent to undesirable downward movement of the assembly relative to the mast, and a shock absorber which is fixed relative to one of the adaptor plate and the frame, which engages the other of the adaptor plate and the frame and which stops downward movement of the frame relative to the adaptor plate over a predetermined distance.

23 Claims, 4 Drawing Sheets

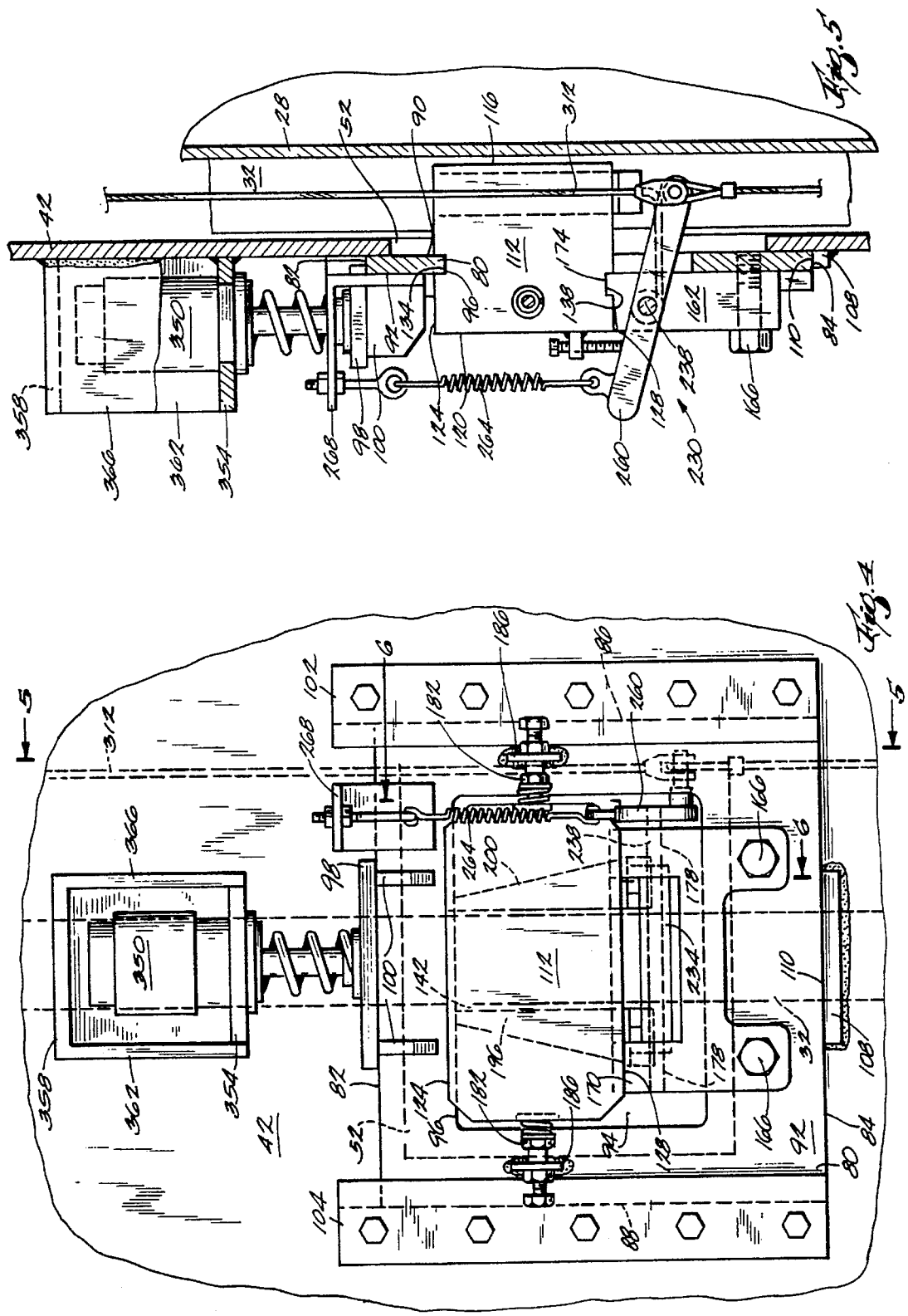

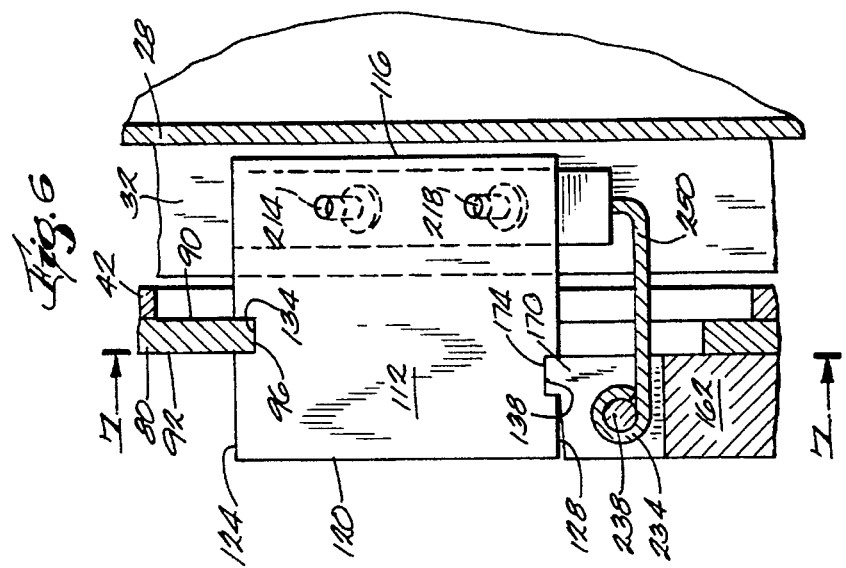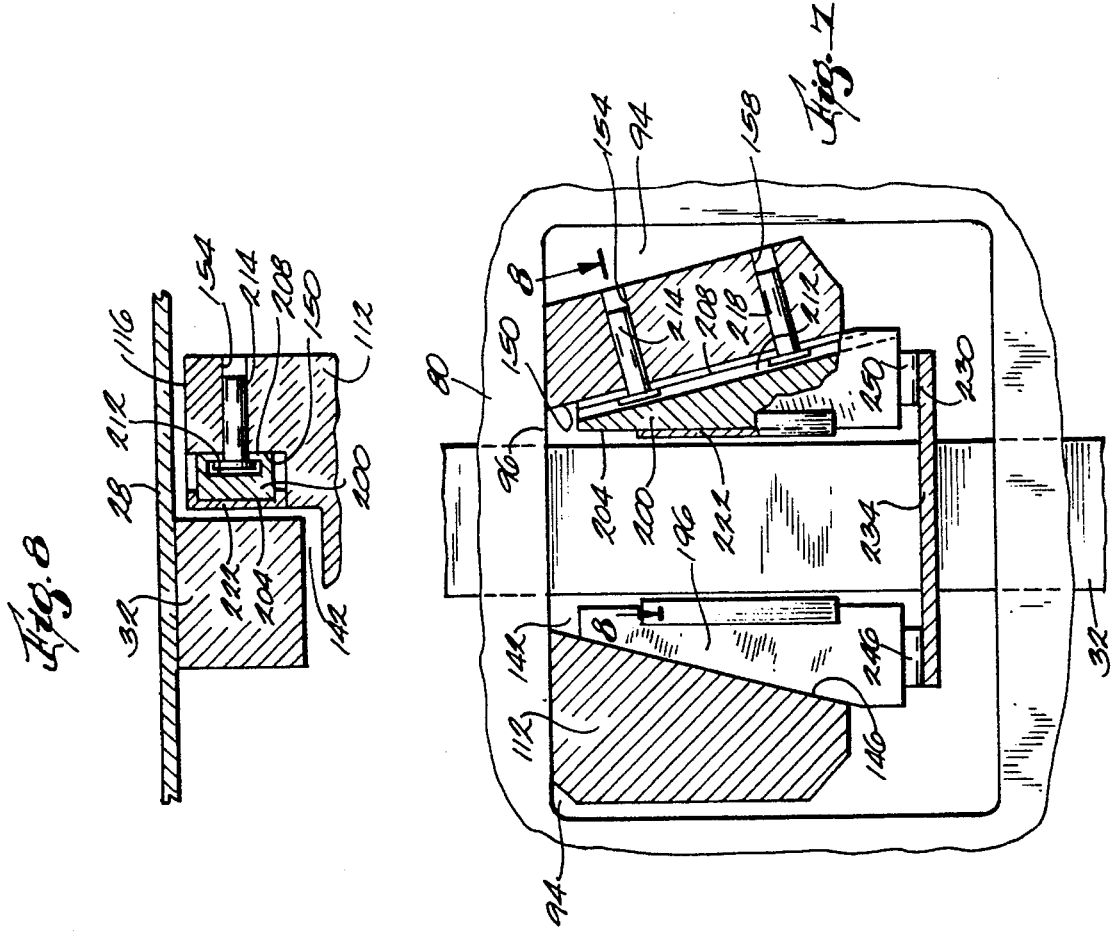

STACKER CRANE WITH IMPROVED BRAKE MECHANISM

This is a continuation of application Ser. No. 08/195,120, filed Feb. 14, 1994, now abandoned.

BACKGROUND OF THE INVENTION

The invention relates to lifting apparatus comprising a mast and a load engaging mechanism moveable vertically along the mast. More particularly, the invention relates to brake mechanisms for preventing either the operator's cab or the load of such an apparatus from accidentally dropping. Still more particularly, the invention relates to stacker cranes.

A conventional stacker crane has a bridge moving along a runway, and a trolley moving along the bridge. The trolley includes a frame and a turntable rotatable relative to the frame about a vertical axis. A conventional stacker crane also includes a mast assembly depending vertically from the turntable. The mast assembly includes an upper or rigid mast depending from the turntable, and an intermediate mast moveable vertically along the rigid mast. An operator's cab is mounted on the intermediate mast for housing an operator controlling the stacker crane. A carriage is moveable vertically relative to the intermediate mast. A load engaging mechanism, such as a pair of forks, moves with the carriage. The carriage is raised and lowered by a hoist assembly on the trolley.

A stacker crane typically includes a brake mechanism for preventing undesirable or uncontrolled downward movement of the operator's cab or the load relative to the rigid mast. A brake mechanism on the intermediate mast includes a brake member which is supported by a housing mounted on the intermediate mast and which engages the rigid mast to prevent downward movement of the intermediate mast relative to the rigid mast. An overspeed mechanism causes the brake member to engage the rigid mast when the downward velocity of the intermediate mast relative to the rigid mast exceeds a predetermined value.

SUMMARY OF THE INVENTION

The invention provides a lifting apparatus, such as a stacker crane, with an improved brake mechanism that creates minimal deceleration forces. While the disclosed brake mechanism stops the intermediate mast and the operator's cab, it should be understood that the brake mechanism could be used to stop the load from dropping.

More particularly, the invention provides a stacker crane comprising a rigid mast, an intermediate mast movable vertically relative to the rigid mast, a carriage movable relative to the intermediate mast, and a load engaging mechanism mounted on the carriage. The improved brake mechanism stops the intermediate mast and the operator's cab in the event of excessively fast downward movement thereof (such as would occur if the hoist rope were to break), while decelerating and stopping the operator's cab with minimal deceleration forces.

The brake mechanism includes an adaptor plate mounted on the intermediate mast for vertical movement relative thereto. A brake housing is mounted on the adaptor plate and supports a pair of brake members for movement between disengaged (or non-braking) positions and engaged (or braking) positions. A lever is operably connected to the brake members and is mounted on the adaptor plate for movement between corresponding disengaged and engaged positions. The lever is biased to the disengaged position and is moved to the engaged position by an overspeed mechanism when the downward velocity of the intermediate mast relative to the rigid mast exceeds a predetermined value. A shock absorber is fixed relative to the intermediate mast and engages the adaptor plate to stop downward movement of the intermediate mast relative to the adaptor plate over a predetermined distance, such that the intermediate mast and operator cab do not abruptly stop when the brake members engage the rigid mast.

Other features and advantages of the invention will become apparent to those skilled in the art upon review of the following detailed description, claims and drawings.

DESCRIPTION OF THE DRAWINGS

FIG. 4 is an elevational view of the brake mechanism.

FIG. 5 is a view taken along line 5—5 in FIG. 4.

FIG. 6 is a view taken along line 6—6 in FIG. 4.

FIG. 7 is a view taken along line 7—7 in FIG. 6.

FIG. 8 is a view taken along line 8—8 in FIG. 7.

Figure 1:
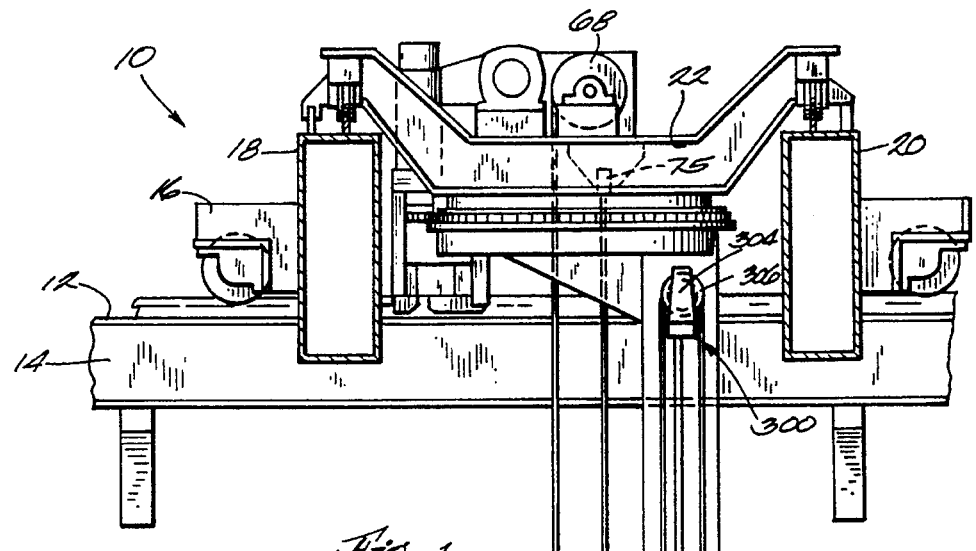
FIG. 1 is an elevational view, partially broken away and in section, of a stacker crane embodying the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A stacker crane 10 embodying the invention is illustrated in the drawings. Except as described below, the crane 10 is identical to the crane disclosed in U.S. Ser. No. 163,936, which was filed Dec. 8, 1993, which is assigned to the assignee hereof, and which is incorporated herein by reference. It should be understood that the invention can be embodied in other types of lifting apparatus having a mast and an assembly movable along the mast.

The stacker crane 10 comprises (see FIG. 1) a runway 12 supported above the floor of a building. The runway 12 includes spaced horizontal beams 14 (only one is shown) supported by opposite walls of the building. The stacker crane 10 also comprises a bridge 16 moveable along the runway 12. The bridge includes parallel bridge members 18 and 20 extending between the runway beams. The stacker crane 10 also comprises a trolley 22 moveable along the bridge 16.

The stacker crane 10 also comprises a mast assembly 24 including a rigid mast 26 depending from and fixedly mounted to the trolley 22. As best shown in FIG. 2, the rigid mast 26 has a box-like construction and includes opposed side walls 28 and 30 having thereon respective vertically extending rails 32 and 34. The mast assembly 24 also includes an assembly 36 moveable along the rigid mast. The assembly 36 includes an intermediate mast 38 supported by the rigid mast 26 for vertical movement relative thereto. As best shown in FIG. 2, the intermediate mast 38 includes a frame 40. The frame 40 has a box-like construction and telescopes over the rigid mast 26. The frame 40 has opposed side walls 42 and 44 respectively spaced from the rigid mast side walls 28 and 30. Each intermediate mast side wall 42 or 44 has thereon (see FIG. 1) upper and lower roller assemblies 46 engaging the associated rail 32 or 34 on the rigid mast 26. Such roller assemblies 46 are conventional and will not be described in greater detail. The roller assemblies 46 restrict the intermediate mast 38 to telescoping vertical movement along the rigid mast 26. The intermediate mast 38 is moveable relative to the rigid mast 26 between a lower position shown in FIG. 1 and a raised position (not shown). The intermediate mast side walls 42 and 44 also have thereon (see FIG. 2) respective vertically extending rails 48 and 50. The wall 42 has therein (see FIGS. 4 and 5) a generally rectangular opening 52, the reason for which is explained below. The assembly 36 also includes (see FIGS. 1 and 2) a carriage 54 supported by the intermediate mast 38 for vertical movement relative thereto. As best shown in FIG. 2, the carriage 54 is generally U-shaped when viewed from above and includes a front or main portion 56 located in front of the intermediate mast 38 (to the left in FIGS. 1 and 2), and spaced side portions 58 and 60 extending outside of the intermediate mast side walls 42 and 44, respectively. Each of the side portions 58 and 60 has (see FIG. 1) upper and lower roller assemblies 62. The roller assemblies 62 on the side portion 58 engage the rail 48, and the roller assemblies 62 on the side portion 60 engage the rail 50. The roller assemblies 62 are substantially identical to the roller assemblies 46 and restrict the carriage 54 to vertical movement along the intermediate mast 38. The assembly 36 also includes (see FIGS. 1 and 2) a load engaging mechanism 64 mounted on the carriage 54. In the illustrated construction, the load engaging mechanism 64 is a pair of conventional forks. Other types of load engaging mechanisms, such as jaws or a magnet, can be employed.

The stacker crane 10 further comprises (see FIG. 1) a hoist mechanism 66 for raising and lowering the carriage 54. The hoist mechanism 66 includes a hoist drum 68 mounted on the trolley 22 for rotation in opposite directions. The hoist mechanism 66 also includes an inverted bottom block 70 mounted on the carriage 54. The bottom block 70 includes (see FIG. 2) a pair of spaced sheaves 72. The hoist mechanism also includes a hoist rope 74 which is wound around the hoist drum 68 and reeved around the bottom block sheaves 72 and an equalizer sheave 75 on the trolley. The hoist mechanism 66 is operable for moving the carriage 54 vertically relative to the intermediate mast 38 and moving the carriage 54 and intermediate mast 38 relative to the rigid mast 26.

Figure 2:
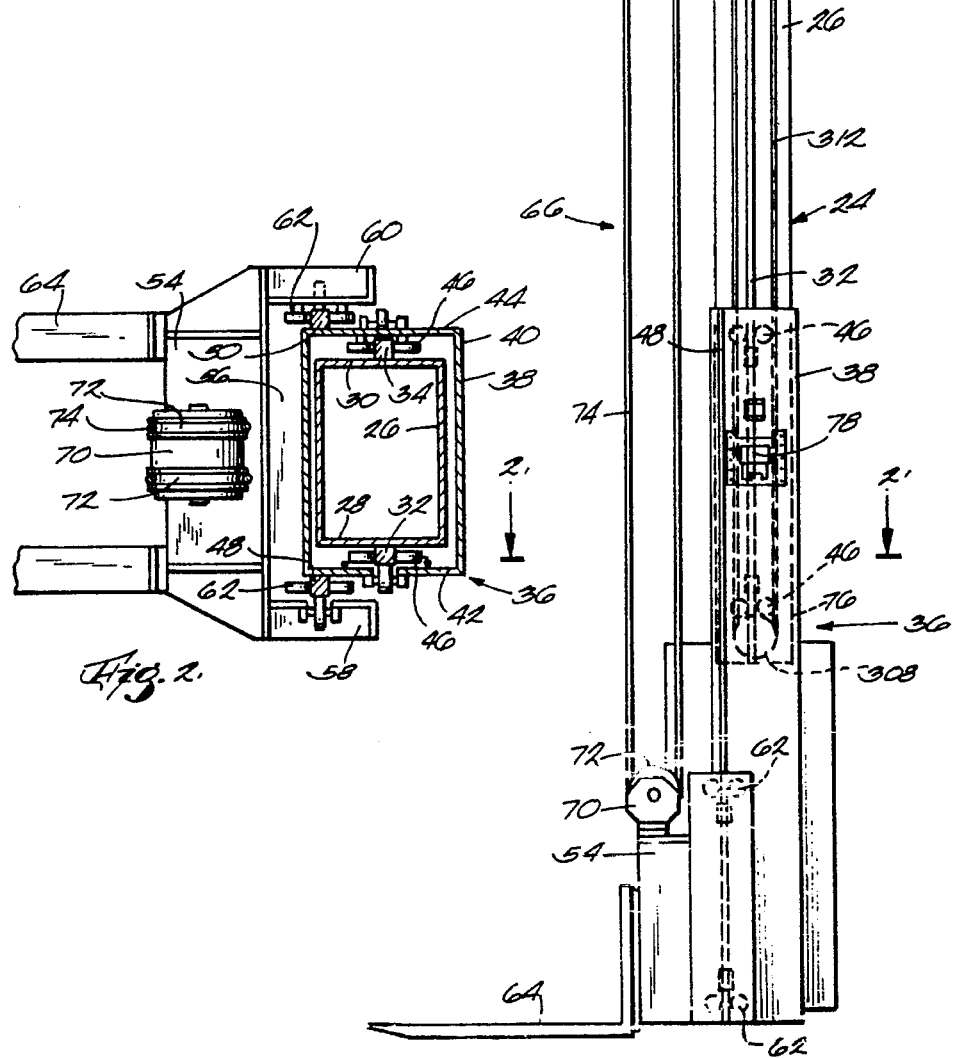
FIG. 2 is a view taken along line 2—2 in FIG. 1.

The stacker crane 10 also comprises (see FIG. 1) an operator's cab 76 fixedly mounted on the intermediate mast 38 as shown in FIG. 1. The operator's cab 76 is conventional and will not be described in greater detail.

The stacker crane 10 also comprises (see FIG. 1) a brake mechanism 78 for preventing excessively fast downward movement of the intermediate mast and the operator's cab, such as would occur if the hoist rope 74 would unexpectedly break. The brake mechanism 78 includes (see FIG. 3) an adaptor plate 80 mounted on the side wall 42 of the intermediate mast 38 for vertical movement relative thereto. As explained below, and as shown in FIG. 4, the plate 80 is generally aligned with the opening 52 in the intermediate mast 38. The adaptor plate 80 is a rectangularly shaped member including (see FIGS. 3 and 4) opposed upper and lower edge portions 82 and 84 and opposed right and left edge portions 86 and 88. The adaptor plate 80 includes (see FIG. 5) opposed inner and outer surfaces 90 and 92 and has therein (see FIGS. 3, 4 and 7) a rectangular opening 94 extending between the inner and outer surfaces 90 and 92. The opening 94 is defined in part by a horizontal edge 96 of the plate 80. The upper end of the adaptor plate 80 has thereon (see FIGS. 3–5) a plate 98 extending outwardly from the outer surface 92. A pair of gussets 100 support the plate 98 relative to the adaptor plate 80.

The plate 80 is supported relative to the intermediate mast 38 by (see FIGS. 3 and 4) supports 102 and 104 which respectively engage the edge portions 86 and 88 of the plate 80 and which hold the adaptor plate 80 against the side wall 42. The supports 102 and 104 are secured to the intermediate mast 38 by bolts 106 and limit the plate 80 to substantially vertical movement relative to the mast 38. Means are provided for limiting downward movement of the adaptor plate 80 relative to the intermediate mast side wall 42. In the illustrated embodiment, such means includes a support key 108 which is welded to the side wall 42 and which has (see FIGS. 4 and 5) an upper surface 110 against which the lower edge 84 of the adaptor plate 80 rests during normal operation of the crane 10.

The brake mechanism 78 also includes a brake housing 112. The housing 112 is a generally rectangular block having (see FIG. 5) generally vertical inner and outer surfaces 116 and 120 and generally horizontal upper and lower surfaces 124 and 128. The upper and lower surfaces 124 and 128 have therein respective rectangular grooves 134 and 138 extending parallel to the inner and outer surfaces 116 and 120. The inner surface 116 has therein (see FIG. 7) a recess 142 through which the rigid mast rail 32 extends, the recess 142 being defined in part by opposed, generally planar, upwardly converging walls 146 and 150. Each of the walls 146 and 150 has therein vertically spaced bores 154 and 158 perpendicular to the associated wall 146 or 150. The brake housing 112 is conventional and will not be described in greater detail.

Figure 3:
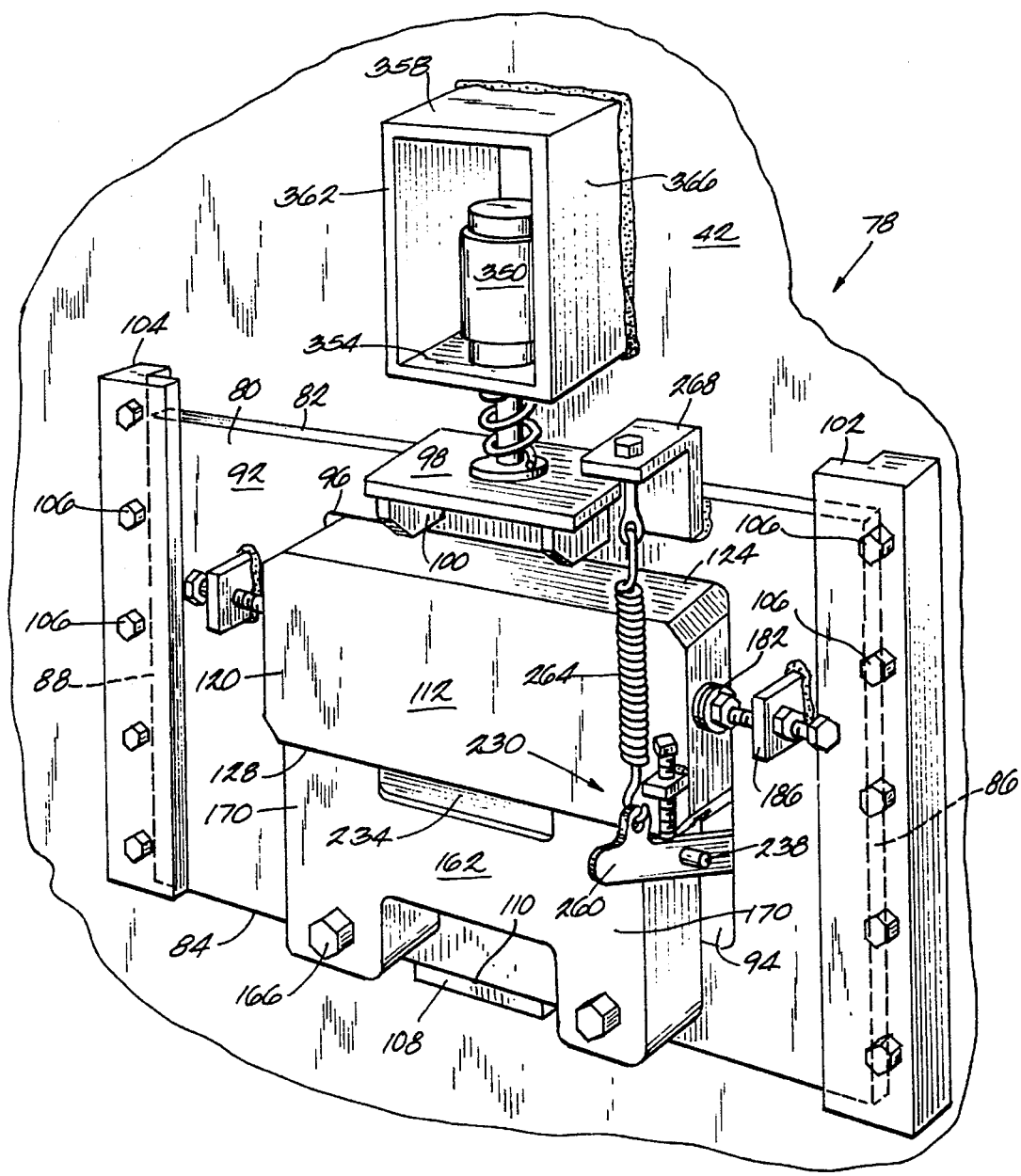
FIG. 3 is an enlarged perspective view showing the brake mechanism illustrated generally in FIG. 1.

The brake housing 112 is mounted on the adaptor plate 80 such that the housing 112 extends through the opening 94 in the plate 80 and such that the housing 112 is movable horizontally relative to the adaptor plate 80 and is fixed against vertical movement relative to the adaptor plate 80. More particularly, as best shown in FIGS. 5 and 6, the edge 96 of the adaptor plate 80 is housed in the groove 134 in the upper surface 124 of the housing 112 such that the housing 112 cannot move upwardly relative to the adaptor plate 80 but can slide horizontally relative to the adaptor plate 80. Downward movement of the housing 112 relative to the adaptor plate 80 is prevented by a bracket 162 mounted on the adaptor plate 80 beneath the housing 112. As best shown in FIGS. 3 and 4, the bracket 162 is generally H-shaped and is fixed to the outer surface of the adaptor plate 80 by a pair of bolts 166. The bracket 162 includes horizontally spaced, upwardly extending legs 170. The upper end of each leg has thereon (see FIG. 5) a rectangular projection 174 housed in the groove 138 in the lower surface 128 of the housing 112 such that the housing 112 is slidable horizontally relative to the bracket 162 and relative to the adaptor plate 80. The bracket legs 170 have therethrough (see FIG. 4) horizontally extending bores 178 having colinear axes.

The brake mechanism 78 also includes biasing means for centering the housing 112 relative to the adaptor plate 80. Such means preferably includes (see FIGS. 3 and 4), on each side of the housing 112, an adjustable spring mechanism 182 extending between the housing 112 and a projection 186 extending from the outer surface of the adaptor plate 80. It should be understood that any suitable spring mechanism can be employed for centering the housing 112.

The brake mechanism 78 also includes (see FIGS. 3 and 7) wedge-shaped brake members 196 and 200 supported by the housing 112. As best shown in FIG. 7, the brake member 196 is supported generally against the wall 146 on one side of the rail 32, and the brake member 200 is supported generally against the wall 150 on the opposite side of the rail 32. The brake members 196 and 200 are mirror images of each other, and only the brake member 200 will be described in detail. The brake member 200 has a generally planar, vertically extending inner surface 204 facing and parallel to the rail 32, and a generally planar outer surface 208 parallel to the brake housing wall 150. The outer surface 208 has therein (see FIG. 8) a slot 212 which slidably captures the enlarged heads of pins 214 and 218 respectively received in the bores 154 and 158 such that the pins 214 and 218 can slide axially in the bores. The brake member 200 can slide relative to the pins in the direction parallel to the brake housing wall 150. The brake member 200 is moveable relative to the housing 112 between a disengaged position (shown in FIG. 7) and an engaged position (not shown). The inner surface 204 of the brake member 200 has thereon a serrated jaw plate 222. As is apparent from viewing FIG. 7, upward movement of the brake members 196 and 200 from their disengaged positions to their engaged positions causes the brake members to move inwardly until the serrated jaw plates 222 engage the rail 32 and substantially prevent movement of the brake housing 112 relative to the rail 32. This construction of the brake members 196 and 200 and the manner in which the brake members 196 and 200 are supported relative to the brake housing 112 is conventional and will not be described in greater detail.

The brake mechanism 78 also includes (see FIGS. 3 and 5) a linkage 230 for moving the brake members 196 and 200 from their disengaged positions to their engaged positions. The linkage 230 includes (see FIGS. 4, 6 and 7) a lever 234 pivotally mounted on the bracket 162 by a shaft 238 extending through the bores 178 in the bracket 162. Thus, the lever 234 is pivotal about the horizontal axes of the bores 178. The lever 234 is fixed to the shaft 238 for common pivotal movement therewith and includes (see FIGS. 6 and 7) spaced arms 246 and 250 extending inwardly from the shaft 238, with the arm 246 having an upturned end engaging the bottom of the brake member 196, and with the arm 250 having an upturned end engaging the bottom of the brake member 200. The linkage 230 also includes (see FIG. 5) a lever 260 fixed to the end of the shaft 238 extending outwardly of the bracket 162 (to the right as shown in FIG. 4). The lever 260 is fixed to the shaft 238 for common pivotal movement therewith. The lever 260 has inner and outer ends (right and left ends as seen in FIG. 5). The lever 260 is moveable between engaged and disengaged positions. In the disengaged position (FIG. 5), the lever 260 is positioned such that the brake members 196 and 200 are in their disengaged positions. When the lever 260 moves from its disengaged position to its engaged position (counterclockwise as seen in FIG. 5), the lever 234 pivots counterclockwise and moves the brake members 196 and 200 upwardly to their engaged positions. Means are provided for biasing the lever 260 to its disengaged position. Such means preferably includes (see FIG. 5) a spring 264 extending between the outer end of the lever 260 and an L-shaped bracket 268 mounted on the outer surface of the adaptor plate 80.

The brake mechanism 78 also includes (see FIG. 1) a conventional overspeed mechanism 300 for moving the lever 260 from its disengaged position to its engaged position in the event of excessively fast downward movement of the intermediate mast and the operator's cab. The overspeed mechanism 300 includes an overspeed device 304 mounted on the upper end of the rigid mast 26. The preferred device 304 is manufactured by Hans Jungblut of Germany and sold under the name Geschwindigkeitsbegrenzer. The overspeed device 304 includes a sheave 306 and a ratchet mechanism (not shown). The function of the ratchet mechanism is described below. The overspeed mechanism 300 also includes an idler sheave 308 mounted on the lower end of the rigid mast 26, and a rope 312 connected to the inner end of the lever 260. The rope 312 is reeved around the sheaves 306 and 308. During normal operation of the crane 10, the rope 312 travels around the sheaves 306 and 308 and follows the lever 260, which follows the intermediate mast 38. The spring 264 prevents the resistance of the rope 312 from accidentally pivoting the lever 260 to its engaged position when the mast 38 is moving downwardly.

The overspeed device 304 is designed such that the sheave 306 is free to rotate as long as the rope 312 does not move at an excessive speed in the direction for lowering the carriage. In the event the rope moves at an excessive speed (above a predetermined value) in the direction of lowering the carriage, the ratchet mechanism of the overspeed device 304 engages and prevents the sheave 306 from rotating and thereby stops movement of the rope 312. When the rope stops, continued downward movement of the intermediate mast 38 and the adaptor plate 80 causes the lever 260 to pivot counterclockwise, as seen in FIG. 5, to its engaged position. As explained above, this causes the brake members 196 and 200 to move to their engaged positions, thereby stopping downward movement of the brake housing 112 and the adaptor plate 80.

The brake mechanism 78 also includes (see FIGS. 3–5) a shock absorber 350 which is fixed relative to the intermediate mast 38 and which engages the adaptor plate 80, and thereby the brake housing 112, and which stops downward movement of the intermediate mast relative to the adaptor plate 80 and relative to the brake housing 112 over a predetermined distance. The preferred shock absorber 350 is a hydraulic shock absorber. The size and the stroke of the shock absorber 350 can be varied to accommodate varied energy absorption capacity requirements. In the preferred embodiment of the invention, the shock absorber 350 keeps deceleration forces on the operator under one G (i.e., less than the force of gravity). As shown in FIGS. 4 and 5, the shock absorber 350 is mounted on a plate 354 extending horizontally outwardly from the intermediate mast wall 42. The plate 354 is reinforced by additional plates 358, 362 and 366 welded to the plate 354 and to the mast wall 42 to form a box enclosing the cylinder portion of the shock absorber 350. The rod portion of the shock absorber 350 extends downwardly from the cylinder portion and engages the upper surface of the plate 98, thereby engaging the adaptor plate 80. As seen in FIG. 5, downward movement of the mast wall 42 relative to the adaptor plate 80 compresses the shock absorber 350 until the mast comes to a stop relative to the adaptor plate 80.

It should be understood that in an alternative embodiment of the invention the shock absorber 350 could be fixed to the adaptor plate 80 and engage the intermediate mast 38.

Various features of the invention are set forth in the following claims.

I claim:

1. A stacker crane apparatus comprising
a trolley movable above the ground,
a generally vertical rigid mast depending from said trolley,
an assembly including a frame moveable along said mast, said frame including a generally vertical wall, and a load engaging mechanism mounted on said frame, and
a brake mechanism including an adaptor plate mounted on said frame for vertical movement relative thereto, said adaptor plate extending generally vertically against said wall, a housing fixed against vertical movement relative to said plate, a brake member which is supported by said housing and which engages said mast to prevent downward movement of said housing relative to said mast consequent to undesirable downward movement of said assembly relative to said mast, and a shock absorber which extends between said plate and said wall and which stops downward movement of said frame relative to said plate over a predetermined distance.

2. Apparatus as set forth in claim 1 wherein said assembly includes an intermediate mast which is supported by said rigid mast for vertical movement relative thereto and which includes said frame, and a carriage supported by said intermediate mast for vertical movement relative thereto, and wherein said load engaging mechanism is mounted on said carriage, and said apparatus further comprising a hoist mechanism for moving said carriage vertically relative to said mast, said hoist mechanism including a hoist drum mounted on said trolley, and a hoist rope wound around said drum and connected to said carriage.

3. Apparatus as set forth in claim 1 wherein said housing is moveable horizontally relative to said adaptor plate.

4. Apparatus as set forth in claim 3 and further comprising biasing means for centering said housing relative to said adaptor plate.

5. Apparatus as set forth in claim 1 and further comprising means for limiting downward movement of said adaptor plate relative to said frame, said means including a projection extending from said wall below said adaptor plate.

6. Apparatus as set forth in claim 1 wherein said adaptor plate has opposed generally vertically extending edge portions, and further comprising supports engaging said edge portions for holding said adaptor plate against said wall and for limiting said adaptor plate to vertical movement relative to said frame.

7. Apparatus as set forth in claim 1 wherein said brake member is moveable relative to said brake housing between an engaged position wherein said brake member engages said rigid mast and a disengaged position wherein said brake member does not engage said rigid mast, and wherein said brake mechanism also includes a lever which is operably connected to said brake member and which is mounted on said adaptor plate for movement between engaged and disengaged positions respectively corresponding to said engaged and disengaged positions of said brake member, and a spring biasing said lever to said lever disengaged position.

8. Apparatus as set forth in claim 7 and further comprising a mechanism for moving said lever to said lever engaged position when the downward velocity of said assembly exceeds a predetermined value.

9. Apparatus as set forth in claim 1 wherein said wall has therein an opening, wherein said adaptor plate is aligned with said opening, and wherein said housing extends into said opening.

10. Apparatus as set forth in claim 9 wherein said plate has therein an opening, and wherein said housing is located in said opening in said plate.

11. Apparatus as set forth in claim 1 wherein said plate has thereon a generally horizontal projection, and wherein said shock absorber extends between said projection and said wall.

12. Lifting apparatus comprising
a generally vertical rigid mast,
an assembly including a frame moveable along said mast, said frame including a generally vertical wall, and a load engaging mechanism mounted on said frame,
a first member mounted against said frame wall for vertical movement relative thereto, and
a brake mechanism including a housing fixed against vertical movement relative to said first member, a brake member which is supported by said housing and which engages said mast to prevent downward movement of said housing relative to said mast consequent to undesirable downward movement of said assembly relative to said mast, and a shock absorber which extends between said first member and said wall and which stops downward movement of said frame relative to said first member over a predetermined distance.

13. Apparatus as set forth in claim 12 wherein said assembly includes an intermediate mast which is supported by said rigid mast for vertical movement relative thereto and which includes said frame, and a carriage supported by said intermediate mast for vertical movement relative thereto, and wherein said load engaging mechanism is mounted on said carriage, and said apparatus further comprising a hoist mechanism for moving said carriage vertically relative to said mast, said hoist mechanism including a hoist drum mounted on said trolley, and a hoist rope wound around said drum and connected to said carriage.

14. Apparatus as set forth in claim 12 wherein said housing is moveable horizontally relative to said first member.

15. Apparatus as set forth in claim 14 and further comprising biasing means for centering said housing relative to said first member.

16. Apparatus as set forth in claim 12 and further comprising means for limiting downward movement of said first member relative to said frame, said means including a projection extending from said wall below said first member.

17. Apparatus as set forth in claim 12 wherein said first member has opposed generally vertically extending edge portions, and further comprising supports engaging said edge portions for holding said first member against said wall and for limiting said first member to vertical movement relative to said frame.

18. Apparatus as set forth in claim 12 wherein said brake member is moveable relative to said brake housing between an engaged position wherein said brake member engages said rigid mast and a disengaged position wherein said brake member does not engage said rigid mast, and wherein said brake mechanism also includes a lever which is operably connected to said brake member and which is mounted on said first member for movement between engaged and disengaged positions respectively corresponding to said engaged and disengaged positions of said brake member, and a spring biasing said lever to said lever disengaged position.

19. Apparatus as set forth in claim 18 and further comprising a mechanism for moving said lever to said lever engaged position when the downward velocity of said assembly exceeds a predetermined value.

20. Apparatus as set forth in claim 12 wherein said wall has therein an opening, wherein said first member is aligned with said opening, and wherein said housing extends into said opening.

21. Apparatus as set forth in claim 20 wherein said first member has therein an opening, and wherein said housing is located in said opening in said first member and is movable horizontally relative to said first member.

22. Apparatus as set forth in claim 12 wherein said first member has thereon a generally horizontal projection, and wherein said shock absorber extends between said projection and said wall.

23. A stacker crane apparatus comprising a trolley movable above the ground, a generally vertical rigid mast depending from said trolley, an assembly including a frame moveable along said mast, said frame including a generally vertical wall having therein an opening, and a load engaging mechanism mounted on said frame, and a brake mechanism including an adaptor plate mounted on said frame for vertical movement relative thereto, said adaptor plate extending generally vertically against said wall, being aligned with said opening, and having therein an opening, a housing fixed against vertical movement relative to said plate, said housing being located in said opening in said plate, extending into said opening in said wall, and being movable horizontally relative to said plate, a brake member which is supported by said housing and which engages said mast to prevent downward movement of said housing relative to said mast consequent to undesirable downward movement of said assembly relative to said mast, and a shock absorber which extends between said plate and said wall and which stops downward movement of said frame relative to said plate over a predetermined distance.

* * * * *